United States Patent
Fenner

[15] 3,679,190
[45] July 25, 1972

[54] APPARATUS FOR HANDLING SHRINKABLE MATERIAL

[72] Inventor: James M. Fenner, Niles, Mich.
[73] Assignee: National-Standard Company, Niles, Mich.
[22] Filed: Jan. 15, 1971
[21] Appl. No.: 106,714

Related U.S. Application Data

[63] Continuation-in-part of Ser. No. 807,391, March 14, 1969, abandoned.

[52] U.S. Cl. ............................................. 266/3 R, 75/214
[51] Int. Cl. ........................................................ C21d 9/56
[58] Field of Search .................... 266/2, 2.5, 3; 72/257, 263; 75/211, 214, 223, 224, 227

[56] References Cited

UNITED STATES PATENTS 2,938,234   5/1960   Slade ......................................... 18/55

Primary Examiner—Gerald A. Dost
Attorney—Johnson, Dienner, Emrich, Verbeck & Wagner

[57] ABSTRACT

Apparatus for conveying an elongated component, characterized by being shrinkable upon being heat treated, providing for the support and passage of the elongated component in a sinuous configuration to compensate for shrinkage upon heating, and for utilization of heating means of short length.

11 Claims, 9 Drawing Figures

Inventor:-
James M. Fenner.

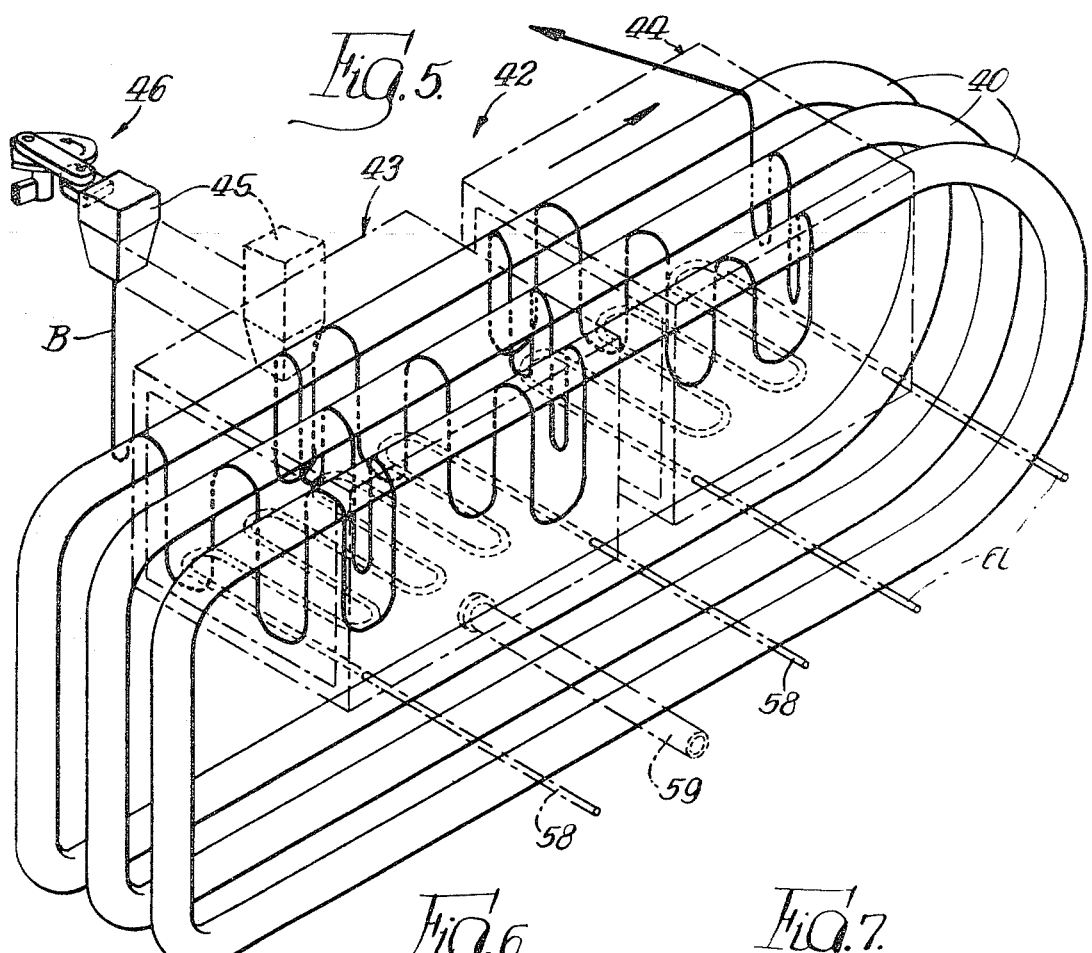
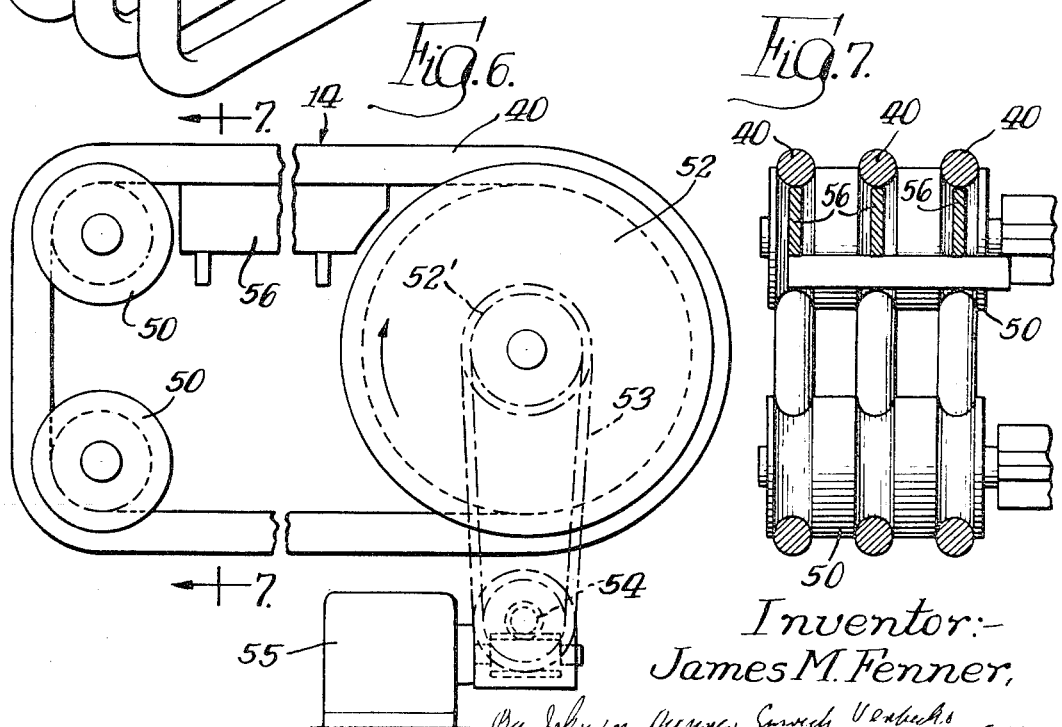

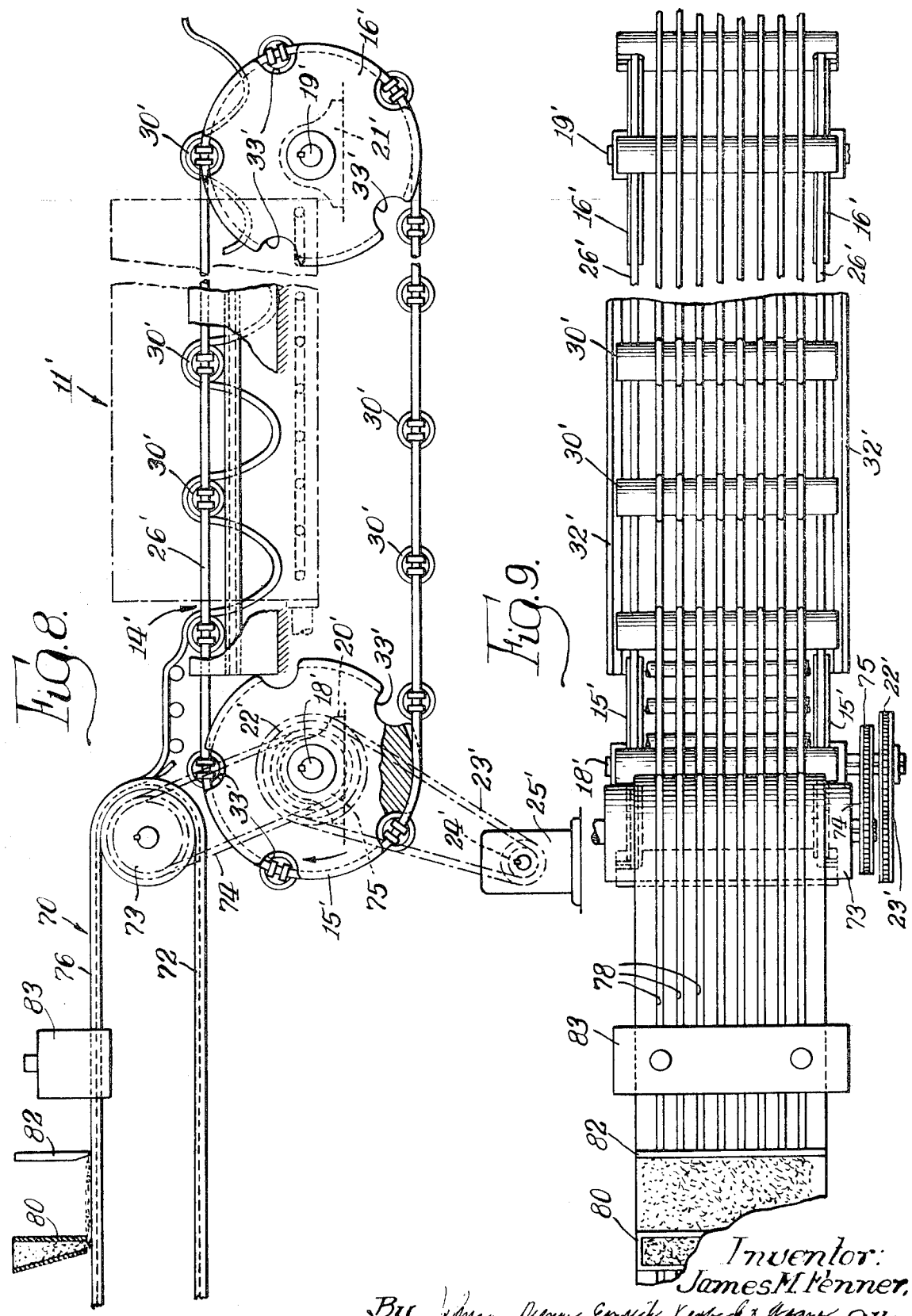

3,679,190

APPARATUS FOR HANDLING SHRINKABLE MATERIAL

This application is a continuation-in-part of my co-pending application, Ser. No. 807,391, filed Mar. 14, 1969 and now abandoned.

BACKGROUND

In the fabrication of elongated articles, such as wire, tubing and strip formed, for example, by forming means such as an extruder for extruding metal compound compacts which are characterized by being ductile when discharged from the extruder but become fragile when heated and subject to shrinking when reduced and/or sintered, the the use of a conventional endless belt type conveyor for conveying the extrusion in a straight continuous length through the reducing and sintering furnaces is not practical. In that the extrusion when subject to heat becomes fragile and when reduced and/or sintered it shrinks, simply supporting a straight extrusion on a conventional endless belt conveyor, due to relative linear movement of the extrusion with respect to the surface of the belt, may result in creating imperfections in or fracturing of the reduced and/or sintered extrusion. Also, due to time requirements for reducing and/or sintering with extruded material laid in a straight continuous length on the upper run of a conventional belt conveyor would necessitate a furnace of substantial length so as to be uneconomic from both space and furnace costs standpoints.

Typical of extruded metal compound compacts with which the apparatus of the invention may be employed were produced in the following manner. The by-product iron oxide, from spent pickle recovery was milled in a conventional manner until 50 percent of the iron oxide particles were less than eight-tenth microns in major dimensions, and 50 percent being in a range of from eight-tenth microns to 10 microns. A binder was then prepared by adding 15 grams of corn starch to 100 milliliters of water and heating the solution to 160° F. until a gel was formed. 4.2 grams of this binder was then added to 22.7 grams of the milled iron oxide powder and the combination was then mixed intimately in the mix-muller. The mixture of iron oxide and binder was then put into the cavity of an extrusion die having an opening of 0.115 inches in diameter and a pressure of 12,000 psi applied which formed a green metal component. This green metal component was then conveyed by the apparatus of the present invention into a furnace having a reducing section providing an atmosphere of hydrogen at a temperature of about 1,000° F. for a period of 5 minutes, and then a sintering section at which the temperature was raised to 2,100° F. and remained at this temperature for 5 minutes during which time sintering was completed.

The apparatus of the present invention also has utility for utilization with tubing formed from a green metal component made from the same formulation as the wire component above described but extruded through a conventional tube forming die to form, for example, a tubular green metal component having an outside diameter of 0.115 inches and an internal diameter of 0.065 inches. Such tubing was then conveyed by the conveyor apparatus of the present invention through the reducing and sintering areas of a furnace in which the tubing was maintained in a hydrogen atmosphere at a temperature of 1,110° F. for 8 minutes to effect reduction of the green metal tubular component. The reduced tubing was then subjected to sintering in the sintering section of the furnace at a temperature of 2,100° F. for a period of 5 minutes.

In the two examples given for wire and tubular members, the reduced and sintered wire and tubing undergo lineal shrinkage of about 30 to 40 percent.

The apparatus of invention also has utility for use with elongated green metal components formed by forming means other than an extruder. By way of example, elongated components of metal compound compacts may be formed into green preforms for elongated components by depositing slurry-like metal compound compacts upon forming means having a surface in which one or more longitudinally extending grooves are formed for receiving the slurry material so that the slurry material is shaped to form one or more elongated components and set therein. The grooves of the forming means are fabricated of material from which the shaped and set material in the grooves may be easily separated from the grooves without fracturing the shaped and set material, and the reducing and/or sintering the shaped and set material as aforedescribed.

The slurry material for the purposes last noted may be composed, in part, of a reducible metal compound such as metal oxide powder which may be reduced and sintered to provide metal wire. The metal oxide compound powders of the slurry material may comprise oxide particles of which at least 35 percent are of a particle size of 10 microns or less as determined by Coulter Counter Analysis. Thus the particle size distribution will be considerably below the maximum 35 percent under 10 microns, and may have a mean particle size no greater than about 6 microns and at least 25 percent by weight, the particles will be below 2.5 microns in diameter. Optimum results are obtained when the apparent average particle of the powder is less than 1 micron in diameter.

That the average particle is less than 1 micron in diameter may be determined by Coulter Counter measurement where agglomeration is not a factor. However, where the particles tend to agglomerate, accurate particle size determination by means such as Coulter Counter measurement is not possible. It has been found, however, that such determination may be made by surface area determination. By determining the total surface area of a given powder one can readily determine the average particle size if one assumes perfectly smooth, spherical particles. Such determination may be made through the utilization of the formula:

$$D = (K)/(d \times SA)$$

where, $D$ = average diameter in microns of perfect spheres
$K$ = the constant 6
$d$ = density in grams per cubic centimeter
$SA$ = surface area of the particles in square meters per gram.

For example, if one determines the surface area of iron oxide ($Fe_2O_3$) to be 5 m²/g and the density to be 5.24 g/cc then:

$$D = (6)/(5.24 \times 5)$$

or $$D = 0.23 \text{ microns}$$

There are a number of known means for determining the surface area of powders each differing to some extent in results. It is found that the BET method developed by Dr. Paul Emmet and his associates in the late 1930's for use in measuring the available surface area of catalysts to be the most reliable for determining the surface of metal compound powders.

In the BET method the surface of the particles is coated with a monomolecular layer of adsorbed gas. This is accomplished by passing a known quantity of gas, such as nitrogen, through a measured specimen at the boiling point of the gas (−195°C. for nitrogen). Under these conditions the gas molecules form a tightly packed monomolecular layer on the surface of the specimen. A determination of the gas consumed by the specimen by monomolecular adsorption as compared to standard specimens readily yields a relatively accurate determination of the surface area of the powder.

For purposes of the foregoing, particle size determination of less than 1 micron shall be interpreted in accordance with BET measurements.

A suitable slurry material for forming continuous elongated green metal components may be composed of the aforementioned Oxide powders together with a binder to provide the slurry material of a consistency to enable the ready deposit of the slurry material onto a grooved belt. A typical binder for iron oxide powder of the particle size range aforenoted may be a PVA-glycerine binder composed of a mixture of polyvinyl alcohol and glycerine in a 80 to 20 ratio mixed with the oxide powder to provide a slurry material of a consistency enabling its deposition onto the forming means as described to fill the grooves in the forming means on the belt.

Upon deposition of slurry material as aforenoted the separated and set green metal elongated components are subjected to reduction and sintering to form elemental wire. Typically, the separated and set green metal elongated components may be suitably passed through a reduction and sintering furnace in which the reduction is effected in an atmosphere of hydrogen at about 1,000° F. for 5 minutes, and sintering at a temperature of about 2,100° F. for about 5 minutes. It will be understood that the reduction and sintering time is dependent on the size and cross section of the material being treated.

In addition to the foregoing example of a slurry material suitable for fabricating metal wire, it will be understood that the apparatus of the present invention is applicable to any reducible metal compound, particularly those susceptible to reduction with hydrogen which have standard free energies of reaction with hydrogen less than about +15 kilo calories (per atom) of hydrogen at the reduction temperature. The metal compounds of particular interest in connection with the foregoing are the metal oxides such as the oxides of Fe, Co, Ni, Cu, Mo, and W, and combinations thereof.

Although the use of hydrogen to provide the environment for reducing the foregoing slurry materials to elemental metal is preferred, other reducing materials may be employed. For example, the above recited metal compounds, and particularly iron oxide, can be reduced by partially or wholly substituting carbon monoxide for the hydrogen reducing environment.

Any metal compound powders having particles of any general shape (i.e., spherical, oblong, needles, or rods, etc.) and originated from any source (i.e., ore deposits, or concentrates, precipitates, etc.) may be employed in providing the slurry material for the present invention for forming elongated green metal components, for example in the grooves of an endless belt, and subsequent reduction and sintering.

The sintered elongated components so derived will possess a substantially pore free structure, a smooth surface and can be made to exhibit densities in excess of 90 percent of completely dense material.

It will be understood that the foregoing examples are only illustrative of metal compound compacts that shrink when reduced and/or sintered, and that the apparatus of the present invention has utility for the many other materials of the class that shrink when reduced and/or sintered.

THE INVENTION

The present invention comprehends the formation of an elongated component of a metal compound compact characterized by being shrinkable upon heating thereof. The formed elongated green metal component is then conveyed in a sinuous configuration through a heating furnace with the sinuous configuration of the elongated component enabling the utilization of heating means of short length. Importantly, the elongated component of sinuous configuration may lie in successively supported loops in a vertical plane in the heating means which allows for the progressive longitudinal shrinkage of the elongated green metal component when subjected, for example, to reducing and then sintering. In forming the elongated component into sinuous configuration, and upon passage through the furnace means the successive loops progressively become smaller and this change in dimension is compensated for according to the invention without danger of fracture or cracking of the elongated component, and further prevents any disruption of the surface of the elongated component in that no substantial force opposes shrinkage of the elongated component.

BRIEF DESCRIPTION OF THE DRAWINGS

FIG. 5 is a diagrammatic perspective view of a second form of apparatus of the invention;

FIG. 6 is a side elevational view diagrammatically illustrating the support and drive means for the conveyor shown in FIG. 5;

FIG. 7 is an end elevational view of the apparatus shown in FIG. 6;

FIG. 8 is a side elevational view of a third form of apparatus of the invention; and FIG. 9 is a plan view of the apparatus of FIG. 8.

As seen in FIG. 1, the apparatus there shown comprises forming means, such as an extruder, indicated by the reference numeral 10, furnace means 11 which may be a two section furnace comprising a reducing area 12 having conventional heating means 34 and reducing gas supply means 35, for supplying a reducing gas such as hydrogen or carbon monoxide to the reducing area, and a sintering area 13 provided with conventional heating means 36, and conveyor means 14 for receiving continuous elongated components such as extrusions from the extruder for conveying the extrusions through the furnace means 11 to effect, in the illustrated embodiment, reduction of the extrusions followed by sintering of the extrusions.

The extruder 10 supported as at 10' is of conventional construction and preferably is provided with a plurality of die discharge openings to discharge a plurality of continuous elongated extrusions, as at A, in side-by-side relation onto the conveyor 14 for passing through the furnace means 11. Of course, if desired the extruder could be of a construction to discharge a single continuous extrusion but for economic purposes it is desirable to provide for the discharge of several extrusions.

Figure 4:
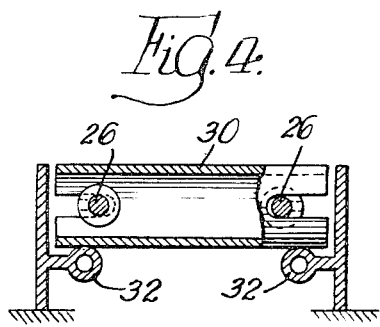
FIG. 4 is a detail vertical sectional view taken substantially along the line 4—4 of FIG. 1 looking in the direction indicated by the arrows.

The conveyor means 14 comprises spaced apart end sprockets 15—15 and 16—16 keyed to shafts 18 and 19, respectively, mounted on bearing blocks 20 and 21, respectively. The shaft 18 is provided with a drive gear 22 connected by a drive chain 23 to the output gear 24 of a prime mover 25. The conveyor means 14 further comprises a pair of endless laterally spaced apart ropes 26 of high temperature resistant material, such as Inconel, which as best seen in FIG. 4 pass through and are secured in the slotted ends at a plurality of transversely extending pins 30 disposed in uniform spaced apart relation lengthwise of and between the spaced apart ropes 26. Guide rails 32 lying inwardly of the side walls of the heating furnace means 11 are engaged by the pins 30 to support the upper run of the conveyor in passing through the furnace means 11.

The sprockets 15—15 and 16—16 are formed with pin receiving recesses 33 into which the pins 30 are disposed in movement of the conveyor. The prime mover 25 thus provides for driving of the sprockets 15—15 and together with the engagement of the pins 30 in the pin receiving grooves 33 provides for driving of the conveyor with the upper run of the conveyor passing from the sprockets 15—15 toward the sprockets 16—16 at the discharge end of the apparatus.

Figure 1:
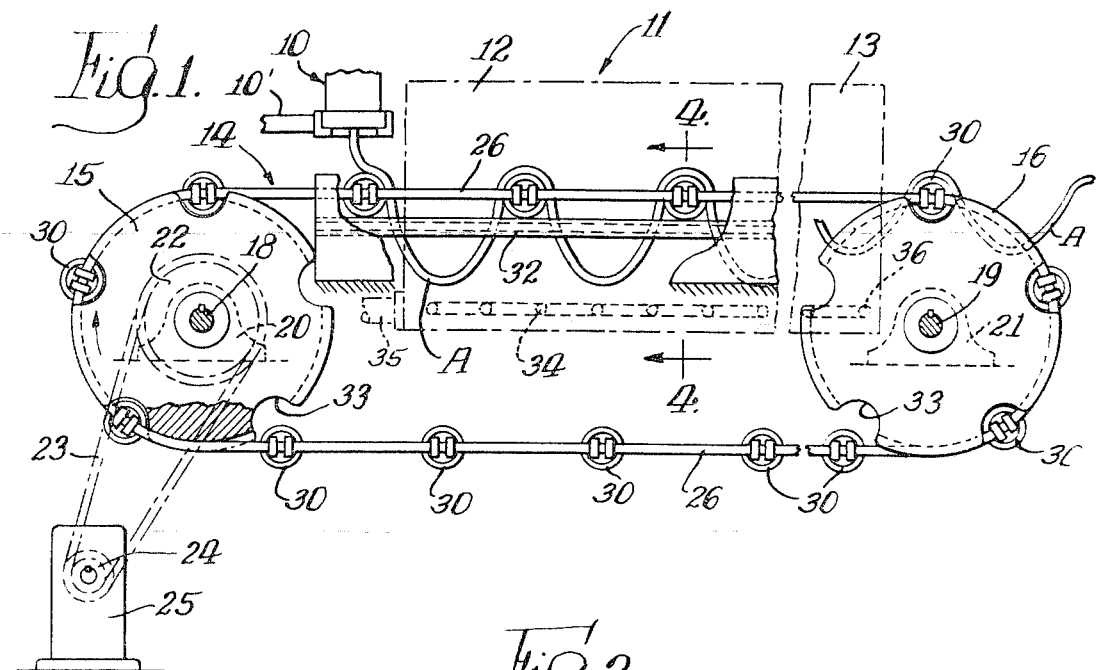
FIG. 1 is a side elevational view of one form of apparatus of the invention.

As best seen in FIG. 1, the extruder 10 is discharging forwardly of furnace means 11 a plurality of spaced apart side-by-side continuous elongated extrusions A upon one of the pins 30. Upon movement of the upper run of the conveyor from the inlet end of the furnace means 11 to the outlet end thereof, it will be observed that the extrusions are supported in continuous sinuous configuration between adjacent supporting members 30. Upon initial passage of the conveyor into the reduction section 12 of the furnace means 11, the extruded material is caused to be chemically reduced and as the upper run of the conveyor progresses through the furnace means 11, the continuous configurations of the extrusions form loops of smaller dimension and with such reduction of the material continuing upon passage of the continuous elongated extrusions through the sintering section 12 of the furnace. The extrusions after passing through the sintering section of the furnace will be of substantially less linear length than when first fed onto the conveyor at the extruder 10. As will be noted, the continuous elongated extrusions A are of sinuous configuration and lie in vertical planes longitudinally of the direction of travel of the upper run of the conveyor means 14.

The afore described apparatus thus provides for the disposal of an elongated extrusion from an extruder onto conveyor means in a manner to provide for a sinuous configuration to the extrusion and which extrusion as it progresses through the furnace means 11 forms pRogressive loops of smaller dimension due to the shrinkage of the material when subjected to reduction and sintering.

Referring now to FIGS. 5 through 7 there is shown a second embodiment of the invention. In FIG. 5 it will be observed that the apparatus there shown comprises a plurality of endless belts 40, again of a heat resistant material such as Inconel, disposed in side-by-side relation for passage through heating means 42 having a reducing section 43 and a sintering section 44.

An extruder 45 serving as a forming means is supported in any suitable manner above the upper runs of the several belts 40 for reciprocatory movement transversely of the upper runs of the belts 40. Conventional reciprocating mechanism 46 is provided to reciprocate the extruder transversely of the upper run of the several belts 40. If desired, the extruder could be fixedly mounted and the conveyor reciprocated transversely thereto. The extruder 45 may be of conventional construction provided at its discharge end with a die opening to discharge a single continuous elongated extrusion as at B which when reciprocated relative to the upper runs of the several belts 40 disposes the continuous length of extruded material B into loops between the several belts 40 which lie substantially in vertical planes transversely of the direction of travel of the several belts 40. Again, as the extruded material laid upon the belts in the manner above described passes through the reducing area 43 with which heating means 58 and reducing gas supply means 59 are associated and through the sintering area 44 heated by heating means 60 it shrinks substantially, so that the loops of the extruded material become progressively smaller as the material passes from the extruder out through the discharge end of the furnace 42.

The several belts 40 as seen in FIGS. 6 and 7 may at the ends thereof forwardly of the extruder 45 be supported on guide idler rollers 50, and with the several belts being looped about a driving drum 52 formed with a plurality of grooves to receive each of the belts 40. A drive gear 52' connected with the common driving drum 52 is driven by means of a chain 53 extending to an output gear 54 of a prime mover and gear reducer assembly 55. Thus upon energization of the drive unit 55, the drive gear 54 through belt 52 engaging with gear 52' effects rotation of the common drive drum 52 to provide for passage of the several belts 40 in a clockwise direction as viewed in FIG. 6. If desired, the lower portions of the upper run of the several belts 40 may be supported by flexible supporting means as diagrammatically indicated at 56 to support the upper runs of the belts 40 in passing through the furnace means 42.

The apparatus shown in FIGS. 8 and 9 embodies conveyor means 14' and furnace means 11' which are the same in all essential respects as conveyor means 14 and furnace means 11 described in connection with FIGS. 1 through 4, except being of greater width to accommodate a greater number of elongated components or filaments for processing, and the primed reference numerals applied to FIGS. 8 and 9 indicate the same parts as described in connection with FIGS. 1 through 3 but being of appropriate size where required to take into account the greater width of conveyor means 14' and furnAce means 11'.

Figure 2:
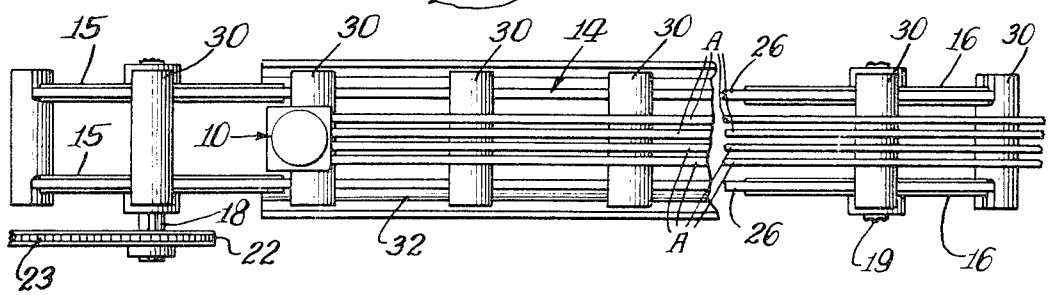
FIG. 2 is a plan view of the apparatus of FIG. 1.
Figure 3:
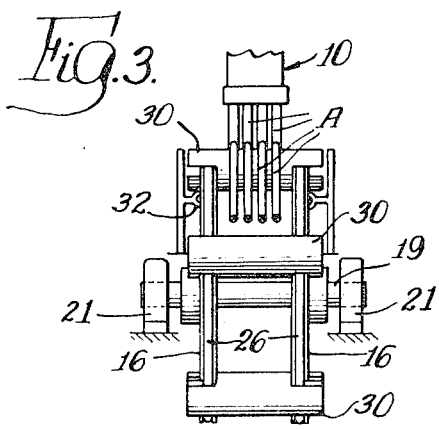
FIG. 3 is an end elevational view of the apparatus shown in FIGS. 1 and 2.

In FIGS. 8 and 9 there is illustrated an apparatus embodying forming means 70, in lieu of an extruder as shown in FIGS. 1 through 3, for forming and delivering elongated components of a metal compound compact as aforedescribed to conveyor means 14'. The forming means 70 may, by way of example, be in the form of an endless belt means 72 mounted between a pair of spaced apart end roller means, only one of which is shown at 73, which may constitute a drive roller means for the endless belt 72 which may be driven by a drive chain 74 extending between the drive roller means 73 for the belt 72 driven off of the drive gear 75 keyed to shaft 18' of the conveyor means 14'. The drive means described thus provides for effecting longitudinal movement of the upper run 76 of the endless belt 70 from left to right as viewed in FIGS. 8 and 9. The endless belt means 70 is formed with a plurality of indentations defined by spaced apart circumferentially continuous grooves 78 which may be of any desired cross sectional configuration.

Hopper means 80 is suitably supported above the upper run 75 of the endless belt means 70 by conventional means, not shown, for depositing the aforementioned metal compound compact material upon the belt for filling the grooves in the belt. Doctor blade means 82 may be supported in any suitable manner downstream from the hopper means 80 to assure filling of the grooves with the metal compound compact material.

Downstream of the doctor blade means 82 of the upper run 75 of the endless belt 70 passes through heating means 83, such as a conventional heating oven, so as to set the material in the grooves of the endless belt when such heating is required for setting. After passage of the upper run of the endless belt 70 through the heating means 83, the set material in the grooves is discharged from the endless belt means 70 at its discharge end and passed therefrom onto the conveyor means 14' in which the elongated green metal components are then processed as described in connection with FIGS. 1 through 4.

Thus it will be seen in the apparatus of FIGS. 8 and 9 that a large number of circumferentially continuous spaced apart grooves may be formed in the endless belt means 70 to provide for the passage longitudinally of a plurality of elongated green metal components through the furnace means 11'.

The endless belt means 70 is preferably fabricated of a material from which the formed and set green metal elongated components may be readily separated from the grooves without fracturing, for example, a material having low adhesive characteristics, such as Teflon or polyethylene.

It will be understood from the foregoing that the invention embodies apparatus as shown and described in connection with FIGS. 1 through 4 and FIGS. 8 and 9 in which one or more elongated continuous components are discharged from forming means into sinuous configuration in a vertical plane in the direction of travel of the conveyor through a heating furnace having reducing and sintering areas. In the apparatus described in connection with FIGS. 5 through 6, continuous elongated metal components are discharged transversely of the direction of the movement of the conveyor to dispose the material in sinuous configuration lying in planes substantially transverse to the direction of travel of the conveyor through a heating means.

The invention claimed is:

1. An apparatus for heat treating an elongated extrusion which is characterized by being shrinkable upon heat treating thereof comprising furnace means having reducing and sintering means for reducing and sintering the extrusion, an extruder for extruding the elongated extrusion, conveyor means for receiving the elongated extrusion from said extruder and conVeying the extrusion through said furnace means, and supporting means for said conveyor means for supporting the extrusion in a sinuous configuration while being conveyed through said furnace means.

2. The apparatus of claim 1 characterized by said supporting means providing for supporting the extrusion in a vertical plane longitudinally of the direction of travel of said conveyor means.

3. The apparatus of claim 1 characterized by said supporting means providing for supporting the extrusion in a vertical plane transversely of the direction of travel of said conveyor means through said furnace means.

4. The apparatus of claim 3 characterized by the provision of means for effecting reciprocating movement of said extruder transversely of said conveyor means.

5. The apparatus of claim 2 in which said supporting means comprises a plurality of supporting means extending transversely of the direction of travel of the extrusion through the furnace.

6. The apparatus of claim 3 in which said supporting means comprises a plurality of endless conveyor members disposed in side-by-side relationship extending longitudinally in the direction of travel of the extrusion through the heating furnace.

7. An apparatus for heat treating an elongated component which is characterized by being shrinkable upon heat treating thereof comprising furnace means having reducing and sintering means for reducing and sintering the elongated component, forming means for forming the elongated component, conveyor means for receiving the elongated component from said forming means and conveying the elongated component through said furnace means, and supporting means for said conveyor means for supporting the elongated component in a sinuous configuration while being conveyed through said furnace means.

8. The apparatus of claim 7 characterized by said supporting means providing for supporting the elongated component in a vertical plane longitudinally of the direction of travel of said conveyor means.

9. The apparatus of claim 7 characterized by said supporting means providing for supporting the elongated component in a vertical plane transversely of the direction of travel of said conveyor means through said furnace means.

10. The apparatus of claim 8 in which said supporting means comprises a plurality of supporting members extending transversely of the direction of travel of the elongated component through the furnace means.

11. The apparatus of claim 9 in which said supporting means comprises a plurality of endless conveyor members disposed in side-by-side relationship extending longitudinally in the direction of travel of the elongated component through the furnace means.

* * * * *